United States Patent
Juenemann et al.

(10) Patent No.: US 7,500,458 B2
(45) Date of Patent: Mar. 10, 2009

(54) METHOD FOR OPERATING MOTOR VEHICLE HAVING AN INTERNAL COMBUSTION ENGINE

(75) Inventors: Thorsten Juenemann, Sindelfingen (DE); Bernd Doerr, Wallduern (DE); Holger Niemann, Ludwigsburg (DE); Per Hagman, Alingsas (SE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 11/490,715

(22) Filed: Jul. 20, 2006

(65) Prior Publication Data

US 2007/0051334 A1 Mar. 8, 2007

(30) Foreign Application Priority Data

Jul. 25, 2005 (DE) .................. 10 2005 034 602

(51) Int. Cl.
*F02N 17/00* (2006.01)
(52) U.S. Cl. .................. 123/179.3; 123/179.4
(58) Field of Classification Search ............ 123/179.3, 123/179.4
See application file for complete search history.

(56) References Cited

U.S. PATENT DOCUMENTS

| | | | | |
|---|---|---|---|---|
| 4,364,343 A | * | 12/1982 | Malik | 123/179.4 |
| 4,630,577 A | * | 12/1986 | Cornacchia | 123/179.3 |
| 4,883,028 A | * | 11/1989 | Wu | 123/179.3 |
| 5,442,550 A | * | 8/1995 | Tasky et al. | 701/62 |
| 6,148,781 A | * | 11/2000 | Boegner et al. | 123/179.3 |
| 6,358,180 B1 | * | 3/2002 | Kuroda et al. | 477/4 |
| 6,371,889 B1 | * | 4/2002 | Kuroda et al. | 477/181 |
| 6,453,865 B2 | * | 9/2002 | Hirose et al. | 123/179.4 |
| 6,650,993 B2 | * | 11/2003 | Wolf et al. | 701/112 |
| 6,817,329 B2 | * | 11/2004 | Buglione et al. | 123/179.4 |
| 7,091,629 B2 | * | 8/2006 | Hawkins | 307/10.6 |
| 7,156,063 B2 | * | 1/2007 | Denz | 123/179.3 |
| 2003/0087724 A1 | * | 5/2003 | Seibertz et al. | 477/92 |

FOREIGN PATENT DOCUMENTS

DE 10239150 A1 * 10/2003

* cited by examiner

*Primary Examiner*—Stephen K Cronin
*Assistant Examiner*—Arnold Castro
(74) *Attorney, Agent, or Firm*—Kenyon & Kenyon LLP (57) ABSTRACT

In a motor vehicle having an internal combustion engine, an enabling condition is a function of at least one operating variable, of the motor vehicle and/or of the internal combustion engine. Starting and/or stopping of the internal combustion engine are enabled as a function of the enabling condition. It is provided that the presence of the enabling condition be checked redundantly within the scope of a 3-level monitoring concept.

14 Claims, 8 Drawing Sheets

METHOD FOR OPERATING MOTOR VEHICLE HAVING AN INTERNAL COMBUSTION ENGINE

FIELD OF THE INVENTION

The present invention relates to a method for operating a motor vehicle having an internal combustion engine. The subject matter of the present invention is also a computer program, an electrical storage medium as well as a control and/or regulating device for a motor vehicle.

BACKGROUND INFORMATION

A method of the type mentioned at the outset is known from the market. It is used, above all, in motor vehicles having a "start-stop system". By this is understood the automatic shutting down and starting up of the internal combustion engine depending on the current driving situation of the motor vehicle. Fuel usage and the emission of pollutants are intended to be reduced thereby. Such a start-stop system is implemented by recording at least one operating variable of the motor vehicle, for instance, its speed, a brake condition, etc., and/or an operating variable of the internal combustion engine, for instance, a rotary speed, and, as a function of this operating variable, enabling the automatic stopping or starting of the internal combustion engine.

SUMMARY OF THE INVENTION

It is the object of the present invention to increase the safety in the operation of a motor vehicle that is equipped with a start-stop system.

This objective is attained by a method. The design approach also includes a computer program, an electrical storage medium, as well as a control and/or regulating device.

System security is considerably increased by the provided redundant checking of the presence of the enabling condition. In the last analysis, by this measure, the functions "start internal combustion engine" and "stop internal combustion engine" are integrated into the function monitoring of the so-called "level 2". Such function monitoring assures that corresponding actions are only able to be carried out if they are checked via an additional and independent path. The crux of the measure according to the present invention is reliably to prevent an inadmissible starting and an inadmissible stopping.

The inadmissibility or the admissibility of stopping or starting the internal combustion engine is derived, in the final analysis, from the behavior of the driver, which influences the operating variables of the motor vehicle and the internal combustion engine. It is important, in this context, that a situation is detected in which starting the internal combustion engine is safely possible even without a driver's command.

The redundant checking is preferably carried out according to a 3-level monitoring concept. In it, the specification of the start enabling takes place in a first level designated as functional level. A continuous monitoring of the presence of the enabling condition is provided in the second level, the "monitoring level". This second level is secured with a great deal of effort, for instance, by duplicate storing of all variables, cyclical RAM checking and ROM checking, program running control, command tests, etc. The third level is used for computer protection. Such a 3-level monitoring concept may include, for example, the use of independent and different test algorithms. A further increase in security is achieved by a plausibility check by which the enabling condition or the operating variable it is based on is checked for its physical significance.

After the operation of an ignition lock, if the reaction of starting of the internal combustion engine takes place by the control of the internal combustion engine, a functional monitoring is also able to take place for such a "key start" which includes at least the enabling condition that a start request signal from an ignition lock is present. Optionally, it may be additionally requested that a power train is open, which is the case, for instance, if a clutch is opened or/and a transmission is in an idling setting or a neutral setting. At this point and subsequently, the assumption is that the underlying operating variables are based on input signals that are secure within the meaning of the redundant function monitoring provided according to the present invention. This means that appropriate sensors are developed in a dual channel manner, and secure signal transmission has to be ensured.

By contrast to the "key start" that was just described, an automatic start is generally admissible if the appropriate driver command is able to be unambiguously derived from the input signals and the corresponding operating variables, and if no other conditions have any say against a start of the internal combustion engine. In addition, there are, however, also situations in which starting the internal combustion engine is enabled even without a detectable driver command if such a start is safely possible. Such a situation may exist, for instance, if a vehicle electrical system management of the motor vehicle requests electrical energy. A connected drive train at risk of an undesired propulsion, in particular, acts counter to an automatic start.

In a motor vehicle having an automatic transmission and an hydraulic converter, an automatic start of the internal combustion engine is permitted when one of the following enabling conditions is present: An accelerator setting is as great as, or greater than a boundary value (the boundary value being such that the motor vehicle is not able to start to roll at the starting of the internal combustion engine; the braking torque being able to be generated via a foot brake or via a so-called "hillholder"); a transmission being in a neutral setting. Here too, the assumption for the security concept according to the present invention is that the input signals underlying the operating variables are secure within the meaning of the function monitoring.

A special case is made possible if there is a hydraulic converter present: In a motor vehicle having such a hydraulic converter, an automatic start-stop operation of the internal combustion engine may be desirable even in the case of an engaged gear. In order to abbreviate the starting time, the starting of the internal combustion engine is able to take place not when the accelerator is first operated, but rather already when the brake is taken off. For indeed, from such a taking off of the brake, one may derive the driver's intention after a forward motion of the motor vehicle, and thus after the starting of the internal combustion engine. Therefore, in this instance, one may still additionally introduce the enabling condition according to which a time after taking off a brake is less than, or equal to a boundary value.

The like applies to a vehicle having a manual shift transmission or having an automatic transmission. In this case what applies is that automatic starting of the internal combustion engine is in a position to be enabled if the drive train is disconnected, that is, in response to an open clutch or when the transmission is in idle. Here, too, one should additionally observe a special case: In the driving off procedure it may happen that the driver of the vehicle operates the transmission out of the idle position even before the end of the starting process, or operates the clutch for driving off (lets the clutch out). In these two cases, the drive train would be engaged. In order to avoid that the starting of the internal combustion engine is prematurely broken off, as an additional possible enabling position one may specify that a time since the connecting of the drive train be less than, or equal to a boundary value. For this purpose, the pedal motion of a brake or the accelerator may possibly also be evaluated, so that a driving-off procedure is able to be detected reliably.

The security in operating the motor vehicle is increased some more if, after an enabling of a starting procedure, a maximum admissible torque is formed for the starter of the internal combustion engine, and a comparison is made with the actual torque of the starter. This makes it possible to block the start of the internal combustion engine in the case of an error.

In a corresponding manner, the above measures also apply to the stopping of the internal combustion engine. Enabling conditions that are relevant are, for instance, that a speed is the same as, or less than a boundary value, or that a braking moment is the same as, or greater than a boundary value.

For a general implementation of the monitoring philosophy according to the present invention it is meaningful for the monitoring function to have independent access to the activation of the starter, for example, via a CAN bus or a switch output stage module and/or to the shutdown path provided for stopping the internal combustion engine. In this way, an inadmissible starting or stopping of the internal combustion engine may be reliably forestalled, if the redundant checking for the presence of the enabling conditions has led to a negative result.

DETAILED DESCRIPTION

Figure 1:
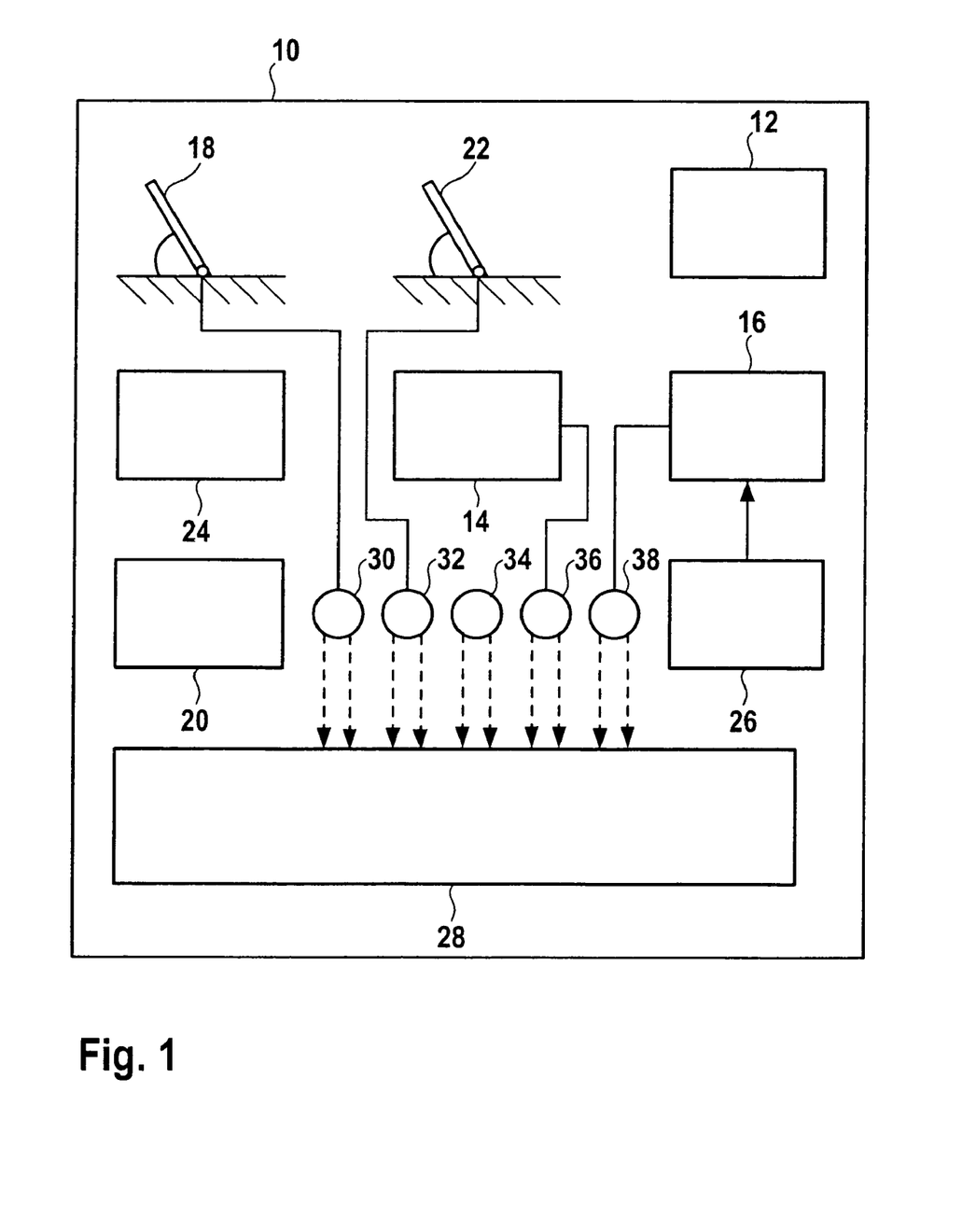
FIG. 1 shows a schematic representation of a motor vehicle having an internal combustion engine and other components.

In FIG. 1, a motor vehicle is shown only schematically by a rectangle, and its reference numeral is 10. Motor vehicle 10 is driven by an internal combustion engine 12 via a transmission 14, a clutch 16 being connected between transmission 14 and internal combustion engine 12. As will be shown below, this may also be designed as a hydraulic converter.

A desired torque of internal combustion engine 12 is expressed by a driver of motor vehicle 10 by the appropriate operation of an accelerator 18. A braking torque of a braking system 20 of motor vehicle 10 is expressed by the driver by the appropriate operation of a brake pedal 22. Motor vehicle 10 has an ignition lock 24 for starting internal combustion engine 12. A crankshaft, that is not shown, of internal combustion engine 12 is put into rotation for starting an electric starter 26.

The operation of motor vehicle 10 is controlled and regulated by a control and regulating device 28. Control and regulating device 28 receives input signals from various sensors, for instance, from an accelerator sensor 30 that picks off the setting of accelerator 18, and from a brake pedal sensor 32 that picks off the setting of brake pedal 22, as well as from additional sensors which record current operating variables of motor vehicle 10 and internal combustion engine 12. To this group belongs, for example, a sensor 34 which records the rotary speed of a wheel, which makes possible the determination of the speed of motor vehicle 10. An additional typical sensor is a transmission sensor 36, which records the current setting of transmission 14, as well as a clutch sensor 38, which records whether clutch 16 is disengaged or engaged.

Sensors 30 through 38 are designed in a dual channel manner, as is indicated by the dashed lines and double arrows which point to control and regulating device 28 but have no reference numerals. Furthermore, the signal transmission is designed so that it may be taken as being validly secure. Control and regulating device 28 activates various actuating devices of motor vehicle 10 and internal combustion engine 12, including electric starter 26. To do this, a computer program is stored in a memory of control and regulating device 28, which is programmed in such a way that certain method steps are carried out.

Figure 2:
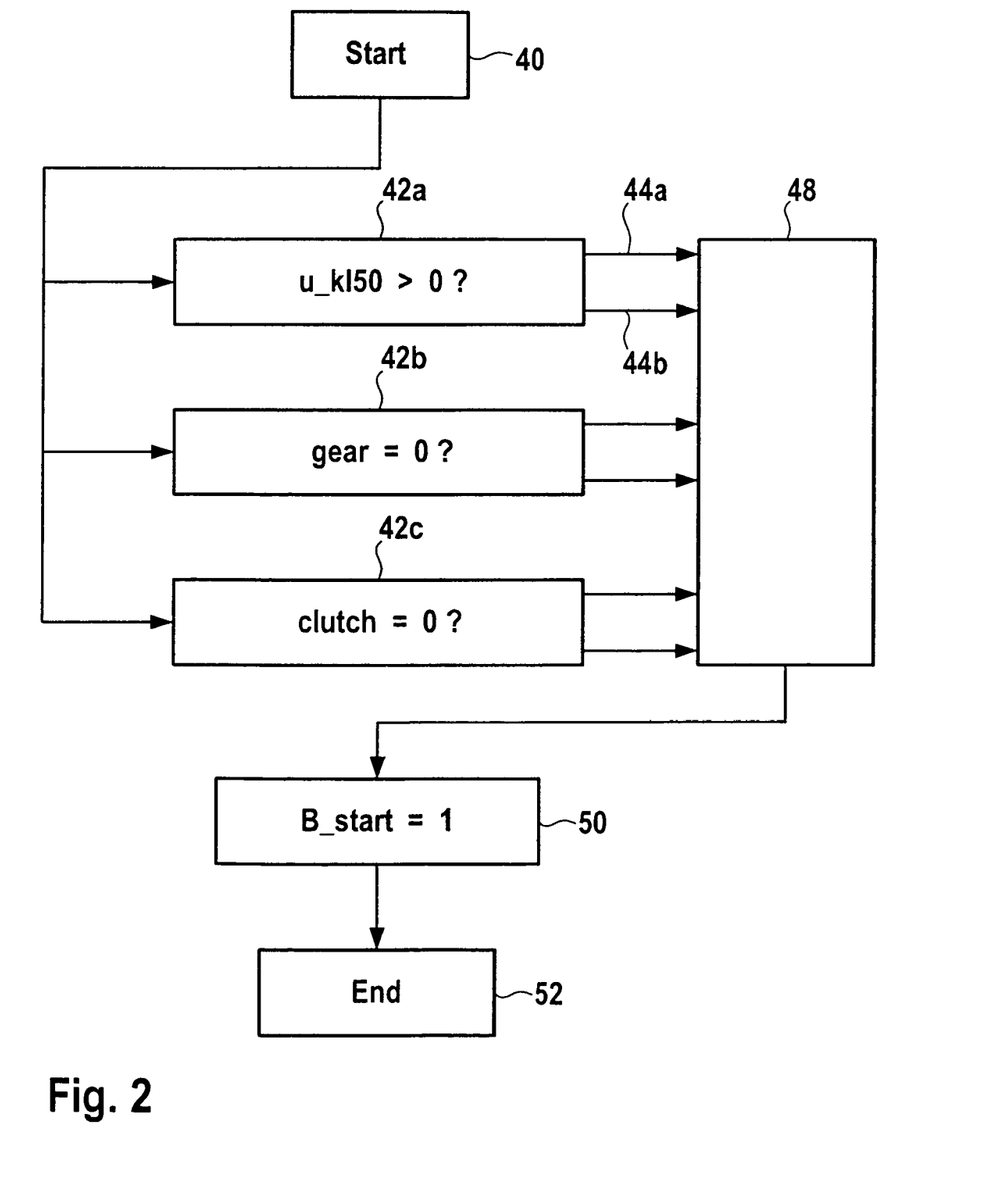
FIG. 2 shows a flow chart of a first exemplary embodiment of a method for enabling a starting of the internal combustion engine of FIG. 1.

A first exemplary embodiment of such a method is shown in FIG. 2. It is used to permit or to block the starting of internal combustion engine 12 by operating ignition lock 24. To do this, three queries are performed after a start block 40: In a block 42a it is checked whether a signal u_k150 is present, that is, whether it is greater than 0. In block 42b it is checked whether transmission 14 is currently in idle, and in block 42c it is checked whether clutch 16 is disengaged. If one of these conditions ("enabling conditions") is present, which is recorded in block 48, then in block 50 a bit B_start is set equal to 1, which means that starting internal combustion engine 12 is admissible. The method ends in block 52.

As is indicated by double arrows 44a and 44b, which for illustrative reasons are provided with reference numerals only for block 42a, and which each lead from blocks 42a, 42b and 42c to recording block 48, checking whether in blocks 42, 44 and 46 there are specified enabling conditions takes place redundantly, using independent and different algorithms. In block 48, in addition, a plausibility check is made by which the physical reality of the respective enabling condition 42a, 42b, 42c is verified.

Figure 3:
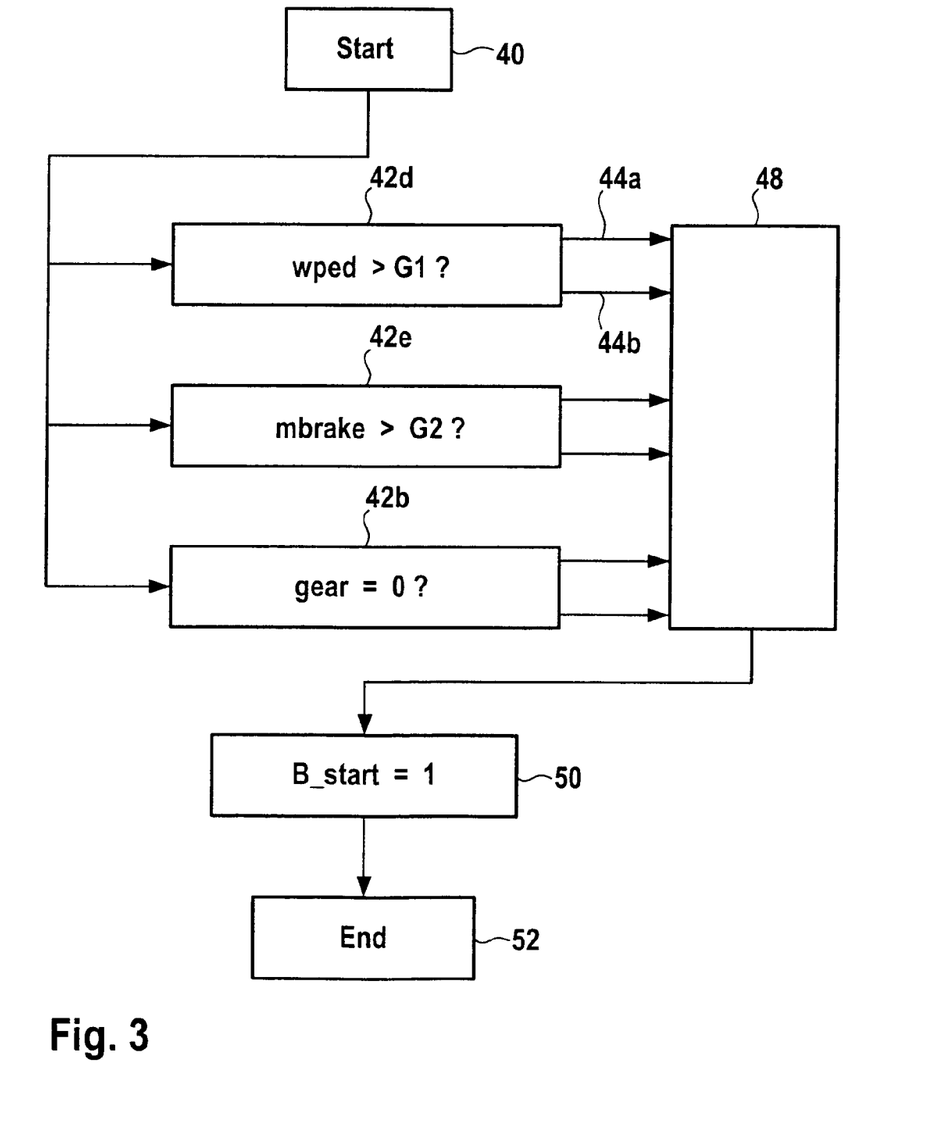
FIG. 3 shows a representation, similar to FIG. 2, of a second exemplary embodiment.

FIG. 3 shows an alternative method. What applies here and below is that such blocks that have equivalent functions to those of blocks described above are not explained again in detail, and have the same reference numerals.

Whereas in the method shown in FIG. 2 the enabling of the starting of internal combustion engine 12 was done in response to a "key start" (signal u_k150 from ignition lock 24), in FIG. 3 the method relates to an automatic start of internal combustion engine 12.

Such a start may, for instance, be required if the driver, after a stopping of internal combustion engine 12, wants to continue driving after a stop at a stop light, and internal combustion engine 12 was previously shut down. Moreover, the method shown in FIG. 3 relates to a motor vehicle having an automatic transmission 14, which is coupled to internal combustion engine 12 via a hydraulic converter 16 instead of a clutch. In this case, too, various enabling conditions are again checked: Thus, in a block 42d it is checked whether an accelerator setting wped is greater than a boundary value G1. In a block 42e it is checked whether a braking torque mbrake is greater than a boundary value G2. Again, if one of enabling conditions 42d, 42e and 42b is satisfied, the starting of internal combustion engine 12 in block 50 is then enabled.

Figure 4:
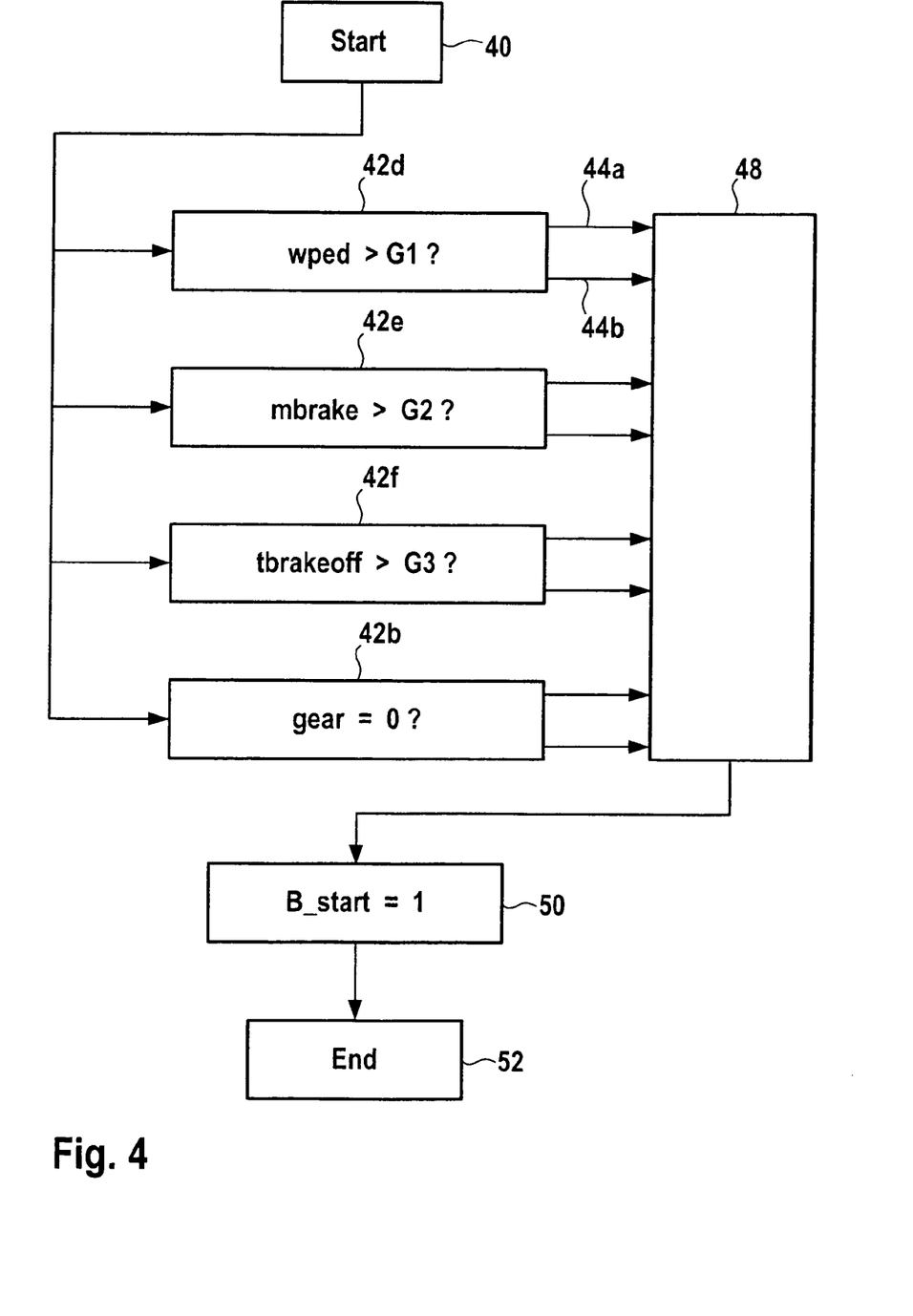
FIG. 4 shows a representation, similar to FIG. 2, of a third exemplary embodiment.

FIG. 4 shows an alternative to that: There, in block 42f, the additional enabling condition is tested as to whether a time tbrakeoff is less than a boundary value G3. Thereby, a starting of internal combustion engine 12 is made possible even if a gear is engaged, which makes the starting time of internal combustion engine 12 shorter, for, in this way, an automatic start is not first admitted when accelerator 18 is operated, but rather, already when brake 20 is released by a corresponding releasing of brake pedal 22. An automatic start is also admitted for a short time G3 after the enabling of brake pedal 22.

Figure 5:
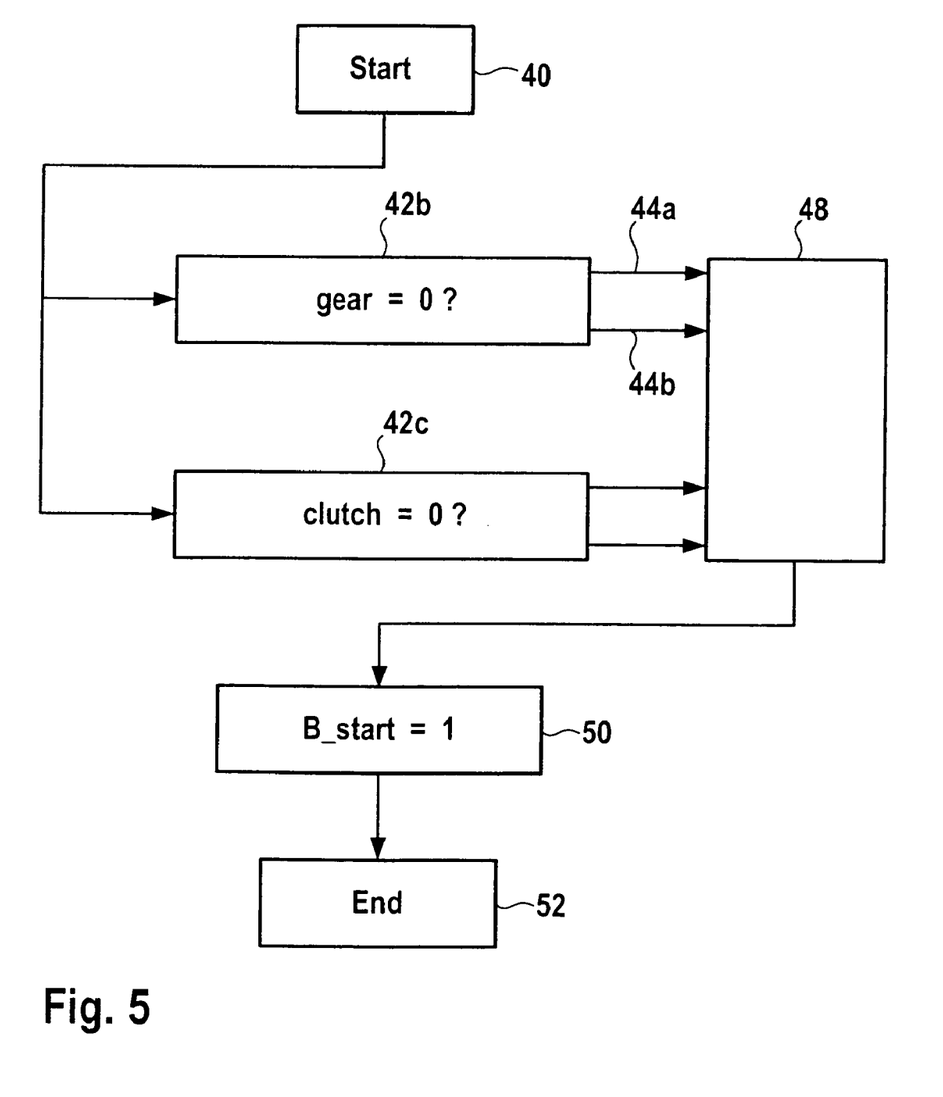
FIG. 5 shows a representation, similar to FIG. 2, of a fourth exemplary embodiment
Figure 6:
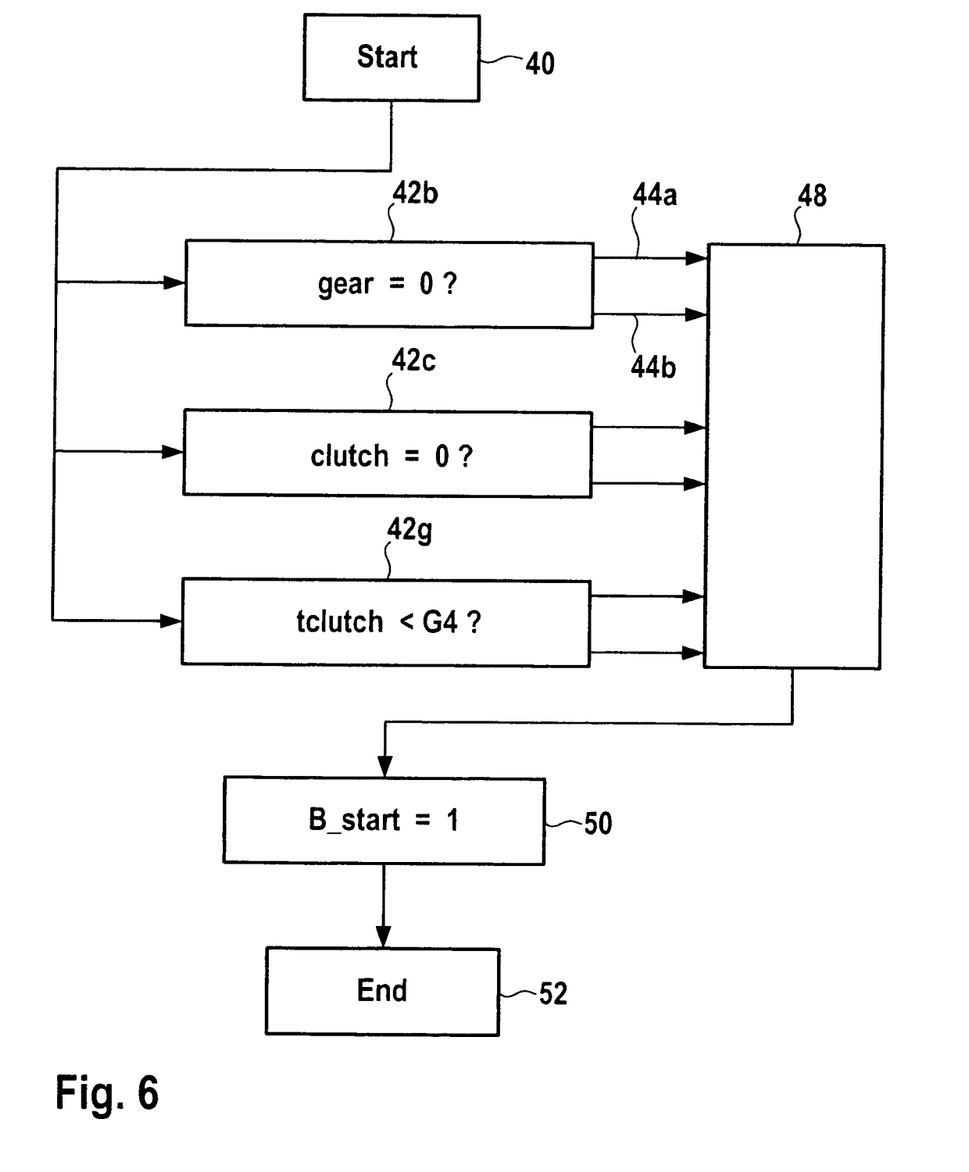
FIG. 6 shows a representation, similar to FIG. 2, of a fifth exemplary embodiment.

FIG. 5 relates to a method for the automatic starting of internal combustion engine 12 in the case of a transmission 14 having a clutch 16. In this case, an automatic starting of internal combustion engine 12 is enabled only if transmission 14 is currently in idle (block 42b) or if the clutch is disengaged (block 42c). In order to prevent breaking off an already initiated starting of internal combustion engine 12, because the driver operates clutch 16 even before the end of the starting, then, as may be seen from FIG. 6, in a block 42g, a continuation is able to be admitted of the starting of internal combustion engine 12 for a time period G4 after the engagement of clutch 16. For this, a time tclutch1 is monitored that has elapsed since engaging clutch 16.

Figure 7:
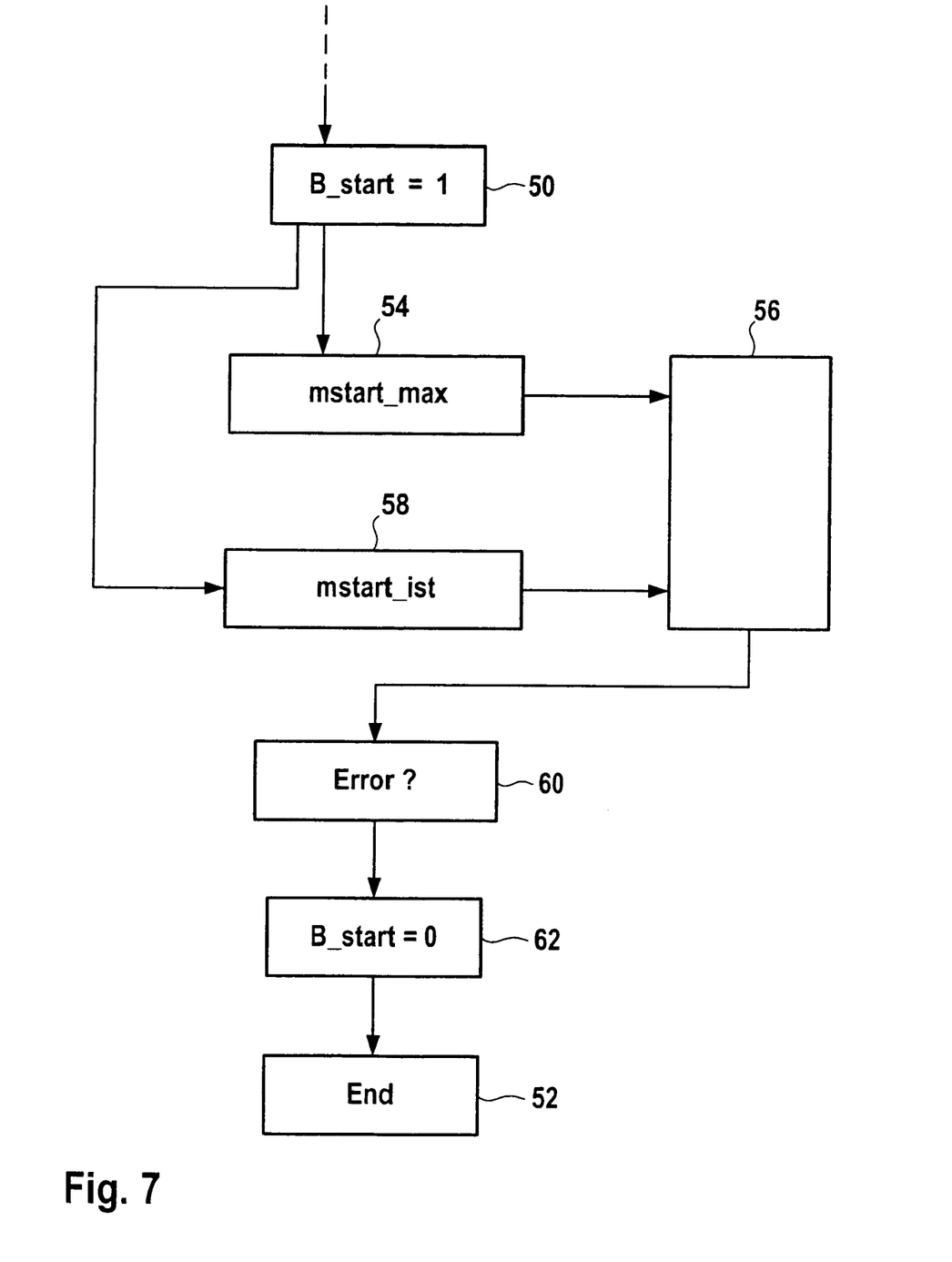
FIG. 7 shows a flow chart of an additional function that is able to be used in the methods of FIGS. 2 through 6.

In all the methods described above that are shown in FIGS. 2 to 6, after the enabling of a starting of internal combustion engine 12, one may proceed as shown in FIG. 7: According to this, in a block 54 a maximum admissible torque mstart_max is ascertained for electric starter 26, and in a block 56 it is compared to a current actual torque mstart_actual of electric starter 26, that is made available in block 58. If actual torque mstart_actual exceeds the admissible torque mstart_max, an error is detected in block 60, and the start is broken off by setting bit B_start equal to zero (block 62).

Figure 8:
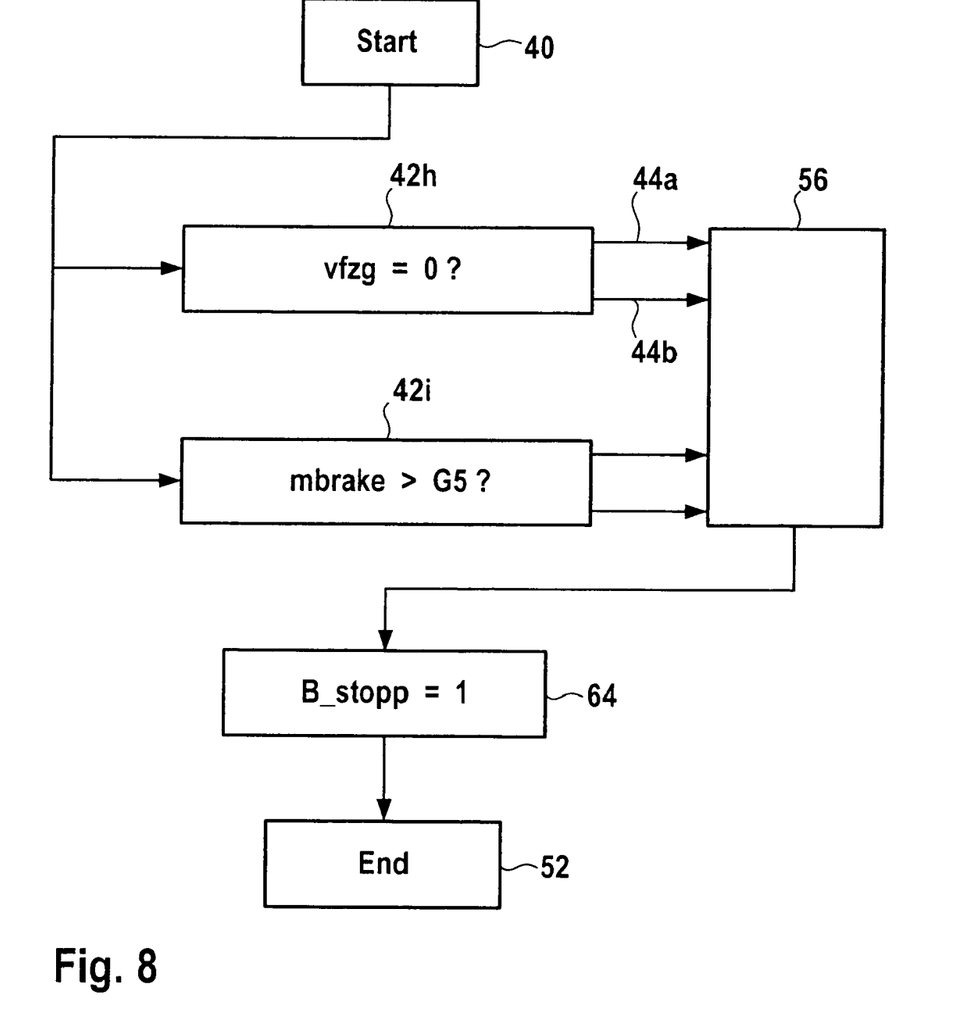
FIG. 8 shows a flow chart of a method for enabling an automatic stopping of the internal combustion engine of FIG. 1.

FIG. 8 shows a method for enabling an automatic stopping of internal combustion engine 12. In this instance, it is checked whether speed vfzg of motor vehicle 10 is equal to zero (block 42h), that is, the vehicle is at a standstill, or whether a braking torque mbrake is greater than a boundary value G5 (block 42i), that is, that brake pedal 22 is being operated. If one of these enabling conditions 42h and 42i is satisfied, a stop bit B_stopp is set to one in block 64, and thereby an automatic stopping of internal combustion engine 12 is enabled.

What is claimed is:

1. A method for operating a motor vehicle having an internal combustion engine, comprising:
    ascertaining, with the aid of a sensor having two channels, at least one operating variable of at least one of the motor vehicle and the internal combustion engine;
    determining an existence of at least one enabling condition which is a function of the at least one operating variable;
    checking redundantly, by using both sensor channels, a presence of the at least one enabling condition; and
    as a function of the at least one enabling condition, enabling at least one of a starting and a stopping of the internal combustion engine.

2. The method as recited in claim 1, wherein a 3-level monitoring concept is used for the redundant checking.

3. The method as recited in claim 2, wherein the 3-level monitoring involves independent and different algorithms.

4. The method as recited in claim 1, wherein the redundant checking includes a plausibility check in which signals of only the sensor are evaluated.

5. The method as recited in claim 1, further comprising:
    selecting an enabling condition for starting from the following group:
        an accelerator setting is equal to, or greater than a first boundary value,
        a braking torque is equal to, or greater than a second boundary value,
        a drive train is disengaged,
        a time since a release of a brake is less than, or equal to a third boundary value,
        a time since an engagement of a drive train is less than, or equal to a fourth boundary value, and
        a start request signal from an ignition lock is present.

6. The method as recited in claim 5, further comprising:
    detecting a disengagement of the drive train when at least one of the following conditions is satisfied:
        a clutch is disengaged, and
        a transmission is currently in one of an idle setting and a neutral setting.

7. The method as recited in claim 1, further comprising:
    selecting the at least one enabling condition for stopping from the following group:
        a vehicle speed is equal to zero, and
        a braking torque is equal to, or greater than a boundary value.

8. The method as recited in claim 1, further comprising:
    if the at least one enabling condition for a starting is present, forming a maximum admissible starter torque, and using the maximum admissible starter torque for monitoring a correct function of a starter.

9. A method for operating a motor vehicle having an internal combustion engine, comprising:
    as a function of at least one enabling condition that is a function of at least one operating variable of at least one of the motor vehicle and the internal combustion engine, enabling a stopping of the internal combustion engine;
    checking redundantly a presence of the at least one enabling condition;
    selecting the at least one enabling condition for stopping from the following group:
        a vehicle speed is equal to zero, and
        a braking torque that is equal to or greater than a boundary value.

10. The method as recited in claim 1, further comprising:
    if the at least one enabling condition for a starting is not present, directly influencing an activation of a starter, wherein the influencing is directly via one of a CAN bus and a switch output stage module.

11. The method as recited in claim 1, further comprising:
    if the at least one enabling condition for a stopping is not present, directly influencing a shutdown path directly via a CAN bus.

12. A method for operating a motor vehicle having an internal combustion engine, comprising:
    as a function of at least one enabling condition that is a function of at least one operating variable of at least one of the motor vehicle and the internal combustion engine, enabling at least one of a starting and a stopping of the internal combustion engine;
    checking redundantly a presence of the at least one enabling condition; and
    if the at least one enabling condition for a starting is present, forming a maximum admissible starter torque, and using the maximum admissible starter torque for monitoring a correct function of a starter.

13. A computer program stored on a recording medium, the computer program relating to operating a motor vehicle having an internal combustion engine, and, when executed, results in a performance of the following:

ascertaining, with the aid of a sensor having two channels, at least one operating variable of at least one of the motor vehicle and the internal combustion engine;

determining an existence of at least one enabling condition which is a function of the at least one operating variable;

checking redundantly, by using both sensor channels, a presence of the at least one enabling condition; and as a function of the at least one enabling condition, enabling at least one of a starting and a stopping of the internal combustion engine.

14. A control and/or regulating device for an internal combustion engine, comprising:

a computer program stored on a recording medium, the computer program relating to operating a motor vehicle having an internal combustion engine, and, when executed, results in a performance of the following:

ascertaining, with the aid of a sensor having two channels, at least one operating variable of at least one of the motor vehicle and the internal combustion engine;

determining an existence of at least one enabling condition which is a function of the at least one operating variable;

checking redundantly, by using both sensor channels, a presence of the at least one enabling condition; and as a function of the at least one enabling condition, enabling at least one of a starting and a stopping of the internal combustion engine.

* * * * *